United States Patent
Wang

(10) Patent No.: US 10,645,229 B1
(45) Date of Patent: May 5, 2020

(54) INTERCOM SYSTEM AND INTERCOM MANAGING METHOD

(71) Applicant: Shenzhen Fugui Precision Ind. Co., Ltd., Shenzhen (CN)

(72) Inventor: Shih-Cheng Wang, New Taipei (TW)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 0 days.

(21) Appl. No.: 16/366,160

(22) Filed: Mar. 27, 2019

(30) Foreign Application Priority Data

Jan. 28, 2019 (CN) .......................... 2019 1 0079228

(51) Int. Cl.
| | |
|---|---|
| H04M 11/00 | (2006.01) |
| H04M 11/02 | (2006.01) |
| G07C 9/00 | (2020.01) |
| H04W 84/12 | (2009.01) |

(52) U.S. Cl.
CPC ....... H04M 11/025 (2013.01); G07C 9/00309 (2013.01); H04M 11/007 (2013.01); H04W 84/12 (2013.01)

(58) Field of Classification Search
CPC .............. H04M 11/025; H04M 11/007; G07C 9/00309; H04W 84/12; H04L 12/2825; H04L 67/04; H04N 7/186; G08B 25/08
USPC ................................................... 379/167.01
See application file for complete search history.

(56) References Cited

U.S. PATENT DOCUMENTS

| | | | |
|---|---|---|---|
| 8,831,970 B2* | 9/2014 | Weik, III | G06Q 10/00 705/13 |
| 9,425,981 B2* | 8/2016 | Foster | H04L 12/2825 |
| 2011/0025852 A1* | 2/2011 | Tanaka | H04N 7/186 348/156 |
| 2013/0017812 A1* | 1/2013 | Foster | H04L 12/2825 455/417 |
| 2014/0002236 A1* | 1/2014 | Pineau | H04W 12/06 340/5.6 |
| 2014/0364098 A1* | 12/2014 | Ueno | H04M 11/025 455/415 |
| 2015/0005900 A1* | 1/2015 | Steele | G05B 15/02 700/19 |
| 2017/0214801 A1* | 7/2017 | Gaspard | H04M 11/025 |
| 2017/0289359 A1* | 10/2017 | Keller | H04M 11/025 |
| 2019/0215936 A1* | 7/2019 | Hartung | G08B 13/19656 |

FOREIGN PATENT DOCUMENTS

| | | |
|---|---|---|
| CN | 106162054 A | 11/2016 |
| CN | 106952366 A | 7/2017 |

* cited by examiner

*Primary Examiner* — Binh Kien Tieu
(74) *Attorney, Agent, or Firm* — ScienBiziP, P.C.

(57) ABSTRACT

A method for managing an intercom system includes obtaining a householder management authority of an intercom official account by an intercom indoor device and transferring the householder management authority to a first mobile terminal of a householder. An intercom request can be generated by an access control device through which a visitor or other is seeking entry, the intercom request being received by the first mobile terminal of the householder. A communication with the access control device can be established, and the access control device can be controlled to open or not open a door. An intercom system is also provided.

18 Claims, 2 Drawing Sheets

INTERCOM SYSTEM AND INTERCOM MANAGING METHOD

FIELD

The disclosure generally relates to an intercom system.

BACKGROUND

Many people live in communities and multi-story buildings. A Guard room or Administration Center can be established and intercoms provided so that people entering into and out of the communities and multi-story building may be identified. Efficient practices in property management are desirable.

BRIEF DESCRIPTION OF THE DRAWINGS

Implementations of the present technology will now be described, by way of embodiments, with reference to the attached figures.

DETAILED DESCRIPTION

Figure 1:
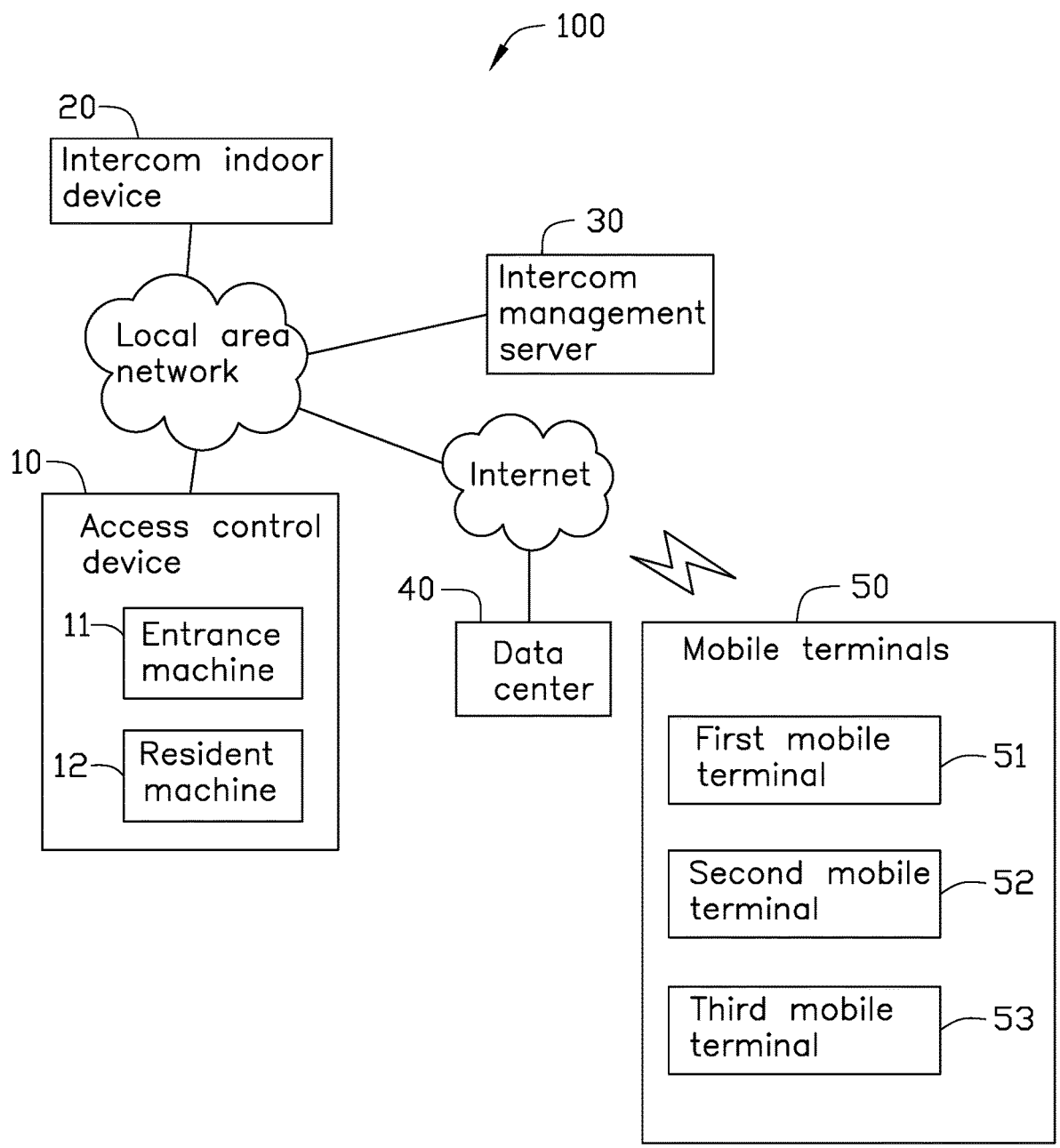
FIG. 1 is a schematic diagram of an intercom system in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrates an intercom managing system 100 of an embodiment of the present disclosure. The intercom system 100 can include an access control device 10, an intercom indoor device 20, an intercom management server 30, a data center 40, and a plurality of mobile terminals 50. The number of the access control devices 10 and the intercom indoor devices 20 can be as many as required.

The access control device 10, the intercom indoor device 20, and the intercom management server 30 can communicate with each other via local area network or wireless network. The intercom management server 30 can communicate with the data center 40 via internet. The mobile terminals 50 can communicate with the access control device 10, the intercom indoor device 20 and the intercom management server 30 via a local area network or a wireless network. The mobile terminals 50 can also communicate with the intercom management server 30 via the mobile network. The mobile network can be a 3G or 4G network.

In at least one embodiment, the access control device 10 can be installed on a door to open the door or keep it locked. The access control device can include an entrance machine 11 installed on a door of a community and/or a residents machine 12 installed on a door of a house.

The intercom indoor device 20 can be installed indoors. The intercom indoor device 20 can include a code scanner (not shown) and a display screen (not shown). The intercom indoor device 20 can receive an intercom request from the access control device 10, establish a communication including video link with the access control device 10, and send a control command to the access control device 10 to open the door. In at least one embodiment, the intercom indoor device 20 can be a tablet computer. An intercom application program (APP) can be installed on the tablet indoor unit 20.

The intercom management server 30 can be installed in a property management center of the community. The intercom management server 30 can be configured to transmit the intercom request to the mobile terminal 50 through the data center 40. The intercom management server 30 can be further configured to set up and manage an intercom official account.

In at least one embodiment, the personnel roles in the intercom official account can include a property management personnel or a system integrator (SI), a householder, and family members. The account of each role can have certain service functions and permissions.

The data center 40 can be configured to manage a cloud service of intercom, including, but not limited to, managing the intercom official account, managing the accounts of users, managing the cloud service, and calculating, storing, and querying data. The mobile terminal 50 can connect with the data center 40 through the mobile network, so that intercom service can be open to the mobile terminal 50 outside the community.

Each mobile terminal 50 can have a camera, a wireless WIFI module, and a 4G communication module. The APP is also installed on the mobile terminal 50. The mobile terminal 50 is configured to perform communication with the access control device 10, and control the access control device 10 to open or not open the door. In at least one embodiment, the mobile terminal 50 can be a smart phone, a tablet computer, or other mobile terminal device. In at least one embodiment, the mobile terminals 50 can include a first mobile terminal 51 owned by the householder, a second mobile terminal 52 owned by the property management personnel, and a third mobile terminal 53 owned by the family member.

Figure 2:
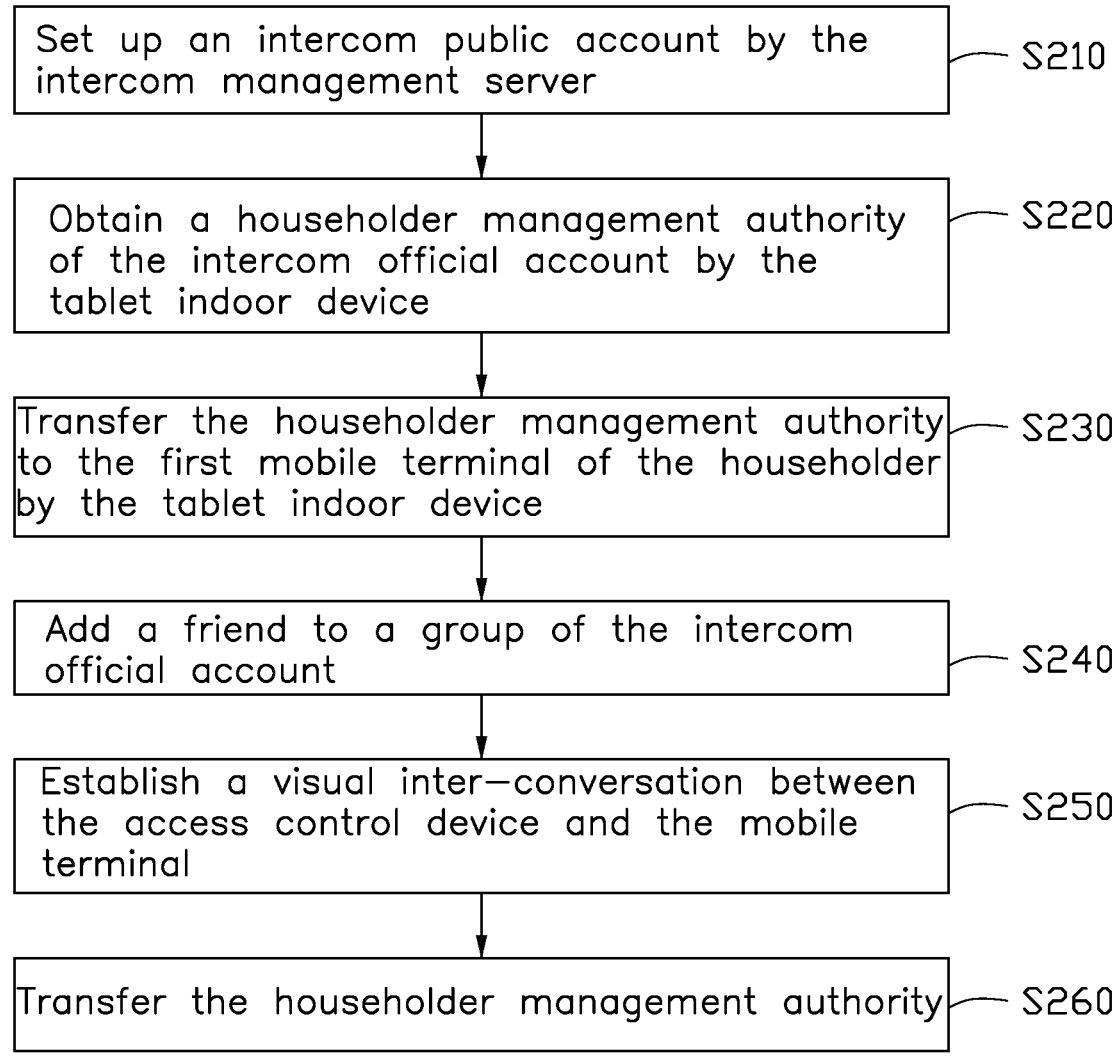
FIG. 2 is a flow chart of an embodiment of a method for managing an intercom system.

An intercom managing method is illustrated in FIG. 2. The method is provided by way of embodiments, as there are a variety of ways to carry out the method. Each block shown in FIG. 2 represents one or more processes, methods, or subroutines carried out in the example method. Additionally, the illustrated order of blocks is by example only and the order of the blocks can be changed. The method can begin at block S210.

At block S210, the intercom management server 30 sets up an intercom official account.

The intercom management server 30 receives a newly added account and binds the new account to a cloud service of intercom to set up an intercom official account.

Specifically, the property management personnel can open a webpage, then add the new manager account and bind the new manager account to the intercom service in the webpage. In binding the new manager account and the intercom service, an intercom name format, a community code, a community account number, and a householder account number may be required. Therefore, the intercom official account may include the intercom name, the community code, the community account number, and the householder account number. The intercom management server 30 is capable of managing a large number of intercom official accounts.

In other embodiments, the intercom official account can also be set up by a system integrator (SI).

At block S220, the intercom indoor device 20 obtains a householder management authority of the intercom official account.

Specifically, the property management personnel can log into the manager account on the second mobile terminal 52, and click on a button to display a two-dimensional code for setting an account of a householder, thus the second mobile terminal 52 of the property management personnel can display the two-dimensional code for setting the account of the householder.

The code scanner of the intercom indoor device 20 can scan the two-dimensional code displayed on the mobile terminal of the property management personnel, and then the property management personnel can select an account number on the APP. Thus each intercom indoor device 20 can bind with the intercom service, and the intercom indoor device 20 can obtain the householder management authority.

At block S230, the intercom indoor device 20 transfers the householder management authority to the first mobile terminal 51 of the householder.

The resident can operate the intercom indoor device 20 and enter an interface transferring the householder management authority. The intercom indoor device 20 can display a two-dimensional code for transferring the householder management authority. The first mobile terminal 51 of the householder can scan the two-dimensional code, and the householder management authority can be transferred to the first mobile terminal 51 of the householder.

The householder can log in the APP on the first mobile terminal 51, select the intercom official account in a list, and manage the intercom official account. The householder management authority includes adding friends to the intercom official account, changing the name of the group, and changing the pictures in the group.

At block S240, the first mobile terminal 51 of the householder can add a friend to a group of the intercom official account.

The friend can be a family member or not. The first mobile terminal 51 of the householder can add the friend to the group of the intercom official account by transmitting an information for joining the friend to the group to the third mobile terminal 53, thus the friend can obtain an authority for using the intercom service under each one of the intercom official accounts. After the family member login into the APP on the third mobile terminal 53, the family member can review the list of the intercom official account and manage the intercom official account in all respects.

The first mobile terminal 51 of the householder can add the intercom indoor device 20 to the group.

At block S250, a connection is established between the mobile terminal 50 and the access control device 10.

The access control device 10 can send an intercom request, the mobile terminal 50 corresponding to the access control device 10 can receive the intercom request and establish the connection with the access control device 10. Then the mobile terminal 50 can control the access control device 10 to open the door.

When the mobile terminal 50 is in the community, the access control device 10 can send the intercom request to the mobile terminal through the local area network or the wireless net network. When the mobile terminal 50 is physically outside the community, the access control device 10 can send the intercom request through the intercom management server 30 and the data center 40.

In at least one embodiment, a visitor may press the account number in the community to be accessed on the entrance machine 11, or can initiate the intercom request by the resident machine 12.

The intercom request is sent to the first mobile terminal 51 of the householder, the first mobile terminal 51 displays an interface for answering the intercom request, and the householder can answer and grant or hang up the intercom request. After the householder answers the intercom request, the first mobile terminal 51 displays an interface for conversation, and the householder can perform a communication with the visitor. In the interface for conversation, the householder can control the access control device 10 to open the door.

In another embodiment, the intercom request can be simultaneously sent to the first mobile terminal 51 of the householder and the third mobile terminal 53 of the family member. The first mobile terminal 51 of the householder and the third mobile terminal 53 of the family member simultaneously display the interface for answering the intercom request. If one of the first mobile terminal and the third mobile terminal answers the intercom request, the other hangs up. After the householder answers the intercom request, the mobile terminal 50 displays an interface for conversation, and the householder can perform a communication with the visitor. In the interface for conversation, the householder can control the access control device 10 to open the door.

The householder can set an intercom request to be sent to one or more mobile terminals 50.

The intercom request can also be sent to one or more of the intercom indoor device 20, the first mobile terminal 51 of the householder, and the third mobile terminal 53 of the family member. The intercom request can be first sent to the intercom indoor device 20. If the intercom indoor device 20 does not answer during a predetermined time, the intercom request can be sent to the first mobile terminal 51 of the householder.

At block S260, the householder management authority is transferred.

When the resident moves out of the community and there is no new resident, the property management personnel can obtain the householder management authority. The property management personnel can log into the APP with the manager account, and click "SI Login QR-Code" on a managing interface to generate a two-dimensional code. Then the property management personnel can press the two-dimensional code to open an interface for transferring the householder management authority and select the transferee account number.

After a new resident moves in, the property management personnel can transfer the householder management authority to the new resident. The property management personnel can click "display the QR-code for setting the householder" on the APP to generate a two-dimensional code. A mobile terminal 50 of the new resident can scan the two-dimensional code, and thereby the householder management authority can be transferred to mobile terminal 50 of the new resident. The new resident can add the intercom indoor device 20 to the group of the intercom official account, thus the intercom indoor device 20 can receive the intercom request.

If a new property management company takes over, the original property management personnel can transfer the intercom management authority of community to the new property company. The original property management personnel can click "transfer the management authority" on the APP to generate a two-dimensional code, and the new property management personnel can scan the two-dimensional code to obtain the intercom management authority.

In other embodiments, the process at block S210 may be omitted, and the intercom official account can be set by SI.

In other embodiments, the processes at block S240 and S260 may be omitted if not required in use.

In other embodiments, at block S230, the data center 40 can transmit an identifying code, such as an electronic key or a barcode, to the second mobile terminal 52 of the property management personnel. The intercom indoor device 20 can input or scan the identifying code to obtain the household management authority.

In other embodiments, at block S240, the family member can scan a two-dimensional code to join the group of the of the intercom official account.

The intercom system 100 uses the intercom indoor device 20 to replace the traditional indoor unit, and integrates the entrance machine 11, the resident machine 12, and the intercom indoor device 20 to provide a network-integrated service. The intercom system 100 forms a hierarchical management of rights through the division of the property, householder, and family member roles, which enables the residents to control the access of their own visitors and the family members. Furthermore, the householder management authority can be obtained by scanning the two-dimensional code, the management burden of property management is reduced.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An intercom system, comprising:
    an access control device installed in a community;
    an intercom indoor device;
    an intercom management server configured to set up and manage an intercom official account;
    a data center; and
    a plurality of mobile terminals comprising a first mobile terminal of a householder;
    wherein the access control device and the intercom indoor device communicate with the intercom management server via a network, the intercom management server communicates with the data center via internet, and each of the plurality of the mobile terminals communicates with the intercom management server;
    wherein the intercom indoor device is configured to obtain a householder management authority of the intercom official account and transfer the householder management authority to the first mobile terminal, the access control device is configured to send an intercom request, and the first mobile terminal is configured to receive the intercom request and establish a communication with the access control device, and control the access control device to open a door; and
    wherein a two-dimensional code for transferring the householder management authority is displayed on the intercom indoor device, and the householder management authority is obtainable by the first mobile terminal by scanning the two-dimensional code displayed on the intercom indoor device.

2. The intercom management system of claim 1, wherein the access control device, the intercom indoor device, and the intercom management server communicate with each other via a local area network or a wireless network; and
    wherein each of the plurality of mobile terminals communicates with the access control device, the intercom indoor device and the intercom management server via the local area network or the wireless network.

3. The intercom management system of claim 1, wherein each of the plurality of mobile terminals communicates with the intercom management server via a mobile network.

4. The intercom management system of claim 1, wherein the intercom indoor device is a tablet computer.

5. The intercom management system of claim 4, wherein the plurality of mobile terminals further comprises a second mobile terminal, a two-dimensional code for setting an account of a householder is displayable on the second mobile terminal, and the intercom indoor device obtains the householder management authority by scanning the two-dimensional code displayed on the second mobile terminal.

6. The intercom management system of claim 1, wherein the first mobile terminal of the householder is further configured for adding a family member to a group of the intercom official account by transmitting an information for joining the family member to the group to a third mobile terminal of the family member.

7. The intercom management system of claim 6, wherein the access control device simultaneously sends the intercom request to the first mobile terminal of the householder and the third mobile terminal of the family member, one of the first mobile terminal and the third mobile terminal answers the intercom request, and the other one hangs up.

8. The intercom management system of claim 1, wherein when the mobile terminal is in the community, the access control device sends the intercom request to the first mobile terminal through the local area network or the wireless net network; and
    when the first mobile terminal is outside the community, the access control device sends the intercom request through the intercom management server and the data center.

9. The intercom management system of claim 1, wherein the intercom request is first sent to the intercom indoor device by the access control device; and if the intercom indoor device does not answer for more than a predetermined time, the intercom request is sent to the first mobile terminal of the householder.

10. The intercom management system of claim 1, wherein the access control device comprises an entrance machine installed on a door of the community and a resident machine installed on a door of a house.

11. An intercom managing method used in an intercom system, the intercom system comprising an access control device installed in a community; an intercom indoor device; an intercom management server configured to set up and manage an intercom official account: a data center; and a plurality of mobile terminals comprising a first mobile terminal of a householder; the method comprising:
    obtaining a householder management authority of the intercom official account by the intercom indoor device;
    transferring the householder management authority to the first mobile terminal by the intercom indoor device;
    sending an intercom request by an access control device;

receiving the intercom request by the first mobile terminal of the householder, establishing a communication with the access control device, and controlling the access control device to open a door;

wherein a two-dimensional code for transferring the householder management authority is displayed on the intercom indoor device, and the householder management authority is obtainable by the first mobile terminal of the householder by scanning the two-dimensional code displayed on the intercom indoor device.

12. The intercom managing method of claim 11, wherein the access control device, the intercom indoor device, and the intercom management server communicate with each other via a local area network or a wireless network, and the intercom management server communicates with the data center via internet; and wherein each of the plurality of mobile terminals communicates with the access control device, the intercom indoor device and the intercom management server via the local area network or the wireless net network.

13. The intercom managing method of claim 11, wherein each of the plurality of mobile terminals communicates with the intercom management server via a mobile network.

14. The intercom managing method of claim 11, wherein the plurality of mobile terminals further comprises a second mobile terminal, a two-dimensional code for setting an account of a householder is displayable on the second mobile terminal, and the intercom indoor device obtains the householder management authority by scanning the two-dimensional code displayed on the second mobile terminal.

15. The intercom managing method of claim 11, wherein after transferring the householder management authority to the first mobile terminal of the householder, the method further comprising:

adding a family member to a group of the intercom official account by transmitting an information for joining the family member to the group to a third mobile terminal of the family member.

16. The intercom managing method of claim 11, wherein the access control device simultaneously sends the intercom request to the first mobile terminal of the householder and the third mobile terminal of the family member, one of the first mobile terminal and the third mobile terminal answers the intercom request, and the other one hangs up.

17. The intercom managing method of claim 11, wherein when the mobile terminal is in the community, the access control device sends the intercom request to the first mobile terminal through the local area network or the wireless net network; and when the first mobile terminal is outside the community, the access control device sends the intercom request through the intercom management server and the data center.

18. The intercom managing method of claim 11, wherein the intercom request is sent to the intercom indoor device by the access control device; and if the intercom indoor device does not answer for more than a predetermined time, the intercom request is sent to the first mobile terminal of the householder.

* * * * *